United States Patent [19]

Nakanishi et al.

[11] Patent Number: 5,701,597
[45] Date of Patent: Dec. 23, 1997

[54] PORTABLE ELECTRONIC DEVICE AND METHOD FOR SUPPLYING CURRENT TO DIFFERENT LOADS

[75] Inventors: Eiichi Nakanishi; Tetsuo Onodera, both of Tokyo, Japan

[73] Assignee: Oki Electric Industry Co., Ltd., Tokyo, Japan

[21] Appl. No.: 436,921

[22] Filed: May 9, 1995

[30] Foreign Application Priority Data

May 12, 1994 [JP] Japan ............... 6-098389

[51] Int. Cl.[6] ................ H02J 7/34; H04B 1/38
[52] U.S. Cl. ............... 455/127; 455/343; 455/89
[58] Field of Search ............... 455/89, 127, 343, 455/128; 307/19, 21, 23, 29, 64, 65, 66, 80, 85

[56] References Cited

U.S. PATENT DOCUMENTS

| | | | |
|---|---|---|---|
| 3,818,237 | 6/1974 | Straus | 307/64 |
| 4,044,268 | 8/1977 | Hammel et al. | 307/66 |
| 5,050,235 | 9/1991 | Kojima | 455/127 |
| 5,519,261 | 5/1996 | Stewart | 307/66 |
| 5,541,929 | 7/1996 | Jokura | 455/343 |

FOREIGN PATENT DOCUMENTS

| | | | |
|---|---|---|---|
| 641089 | 3/1995 | European Pat. Off. | 455/127 |
| 2310656 | 12/1976 | France | 455/127 |
| 1135969 | 4/1961 | Germany | 455/127 |
| 2242083 | 9/1991 | United Kingdom | 455/127 |

*Primary Examiner*—Reinhard J. Eisenzopf
*Assistant Examiner*—Lester G. Kincaid
*Attorney, Agent, or Firm*—Spencer & Frank

[57] ABSTRACT

According to a first aspect, a portable electronic device has at least two load circuits which are independently powered by different batteries. According to a second aspect, the load circuits are powered by the same battery, but their power lines are branched from a node located close to the battery, thereby reducing common impedance. According to a third aspect, two power lines are coupled through switches to two independent batteries, and are mutually coupled through a third switch. The switches are controlled according to the discharge states of the batteries. According to a fourth aspect, a battery charger charges two or more batteries by supplying current to them for short intervals in turn, so that all batteries reach full charge at substantially the same time.

53 Claims, 12 Drawing Sheets

PORTABLE ELECTRONIC DEVICE AND METHOD FOR SUPPLYING CURRENT TO DIFFERENT LOADS

BACKGROUND OF THE INVENTION

The present invention relates to a portable battery-powered electronic device such as a portable wireless communication device, more particularly to its battery pack, to methods of controlling the supply of current from the battery pack, and to methods of recharging the battery pack.

Many portable electronic devices are powered by a battery pack containing one or more battery cells. The cells are conventionally coupled in series or in parallel to a single pair of terminals, so that the cells act as a single battery. A fuse or other protective element is conventionally coupled between the battery and one of the two terminals, to prevent excess current flow.

Strictly speaking, the term battery means two or more interconnected cells, but it is also commonly used to refer to a single cell. This usage of the term battery to mean a single cell will be limited hereinafter to the case in which the cell is used independently. A circuit powered by two interconnected cells, for example, will be regarded as being powered by a single battery consisting of two cells, and not as being powered by two batteries.

The circuits powered by the battery of a typical portable electronic device include memory circuits, control circuits, and display or indicator circuits. In a portable wireless communication device, there are also transmitting and receiving circuits, including a power amplifier that operates while the device is transmitting. All of these circuits conventionally draw current from the same battery.

To reduce power consumption, many recent devices are designed to operate at a reduced voltage, e.g. about two or three volts instead of the traditional five or six volts. In a wireless communication device, however, the power amplifier must provide a certain level of transmitting power, so if operated at a reduced voltage, it must draw more current (power being the product of voltage and current). When a low-voltage wireless communication device is transmitting, the power amplifier tends to draw a large share of the total current supplied from the battery.

As is well known, when current is drawn from a battery, the battery's output voltage is reduced by current flow through the battery's internal resistance. When current is drawn from a battery pack with an internal fuse, there is a further voltage drop across the fuse. Additional voltage drops may occur due to wiring or contact resistance. Because of all these voltage reductions, when the power amplifier in a low-voltage wireless communication device is switched on, the ensuing large current drain can significantly depress the supply voltage.

To conserve power, the control and memory circuits usually have a small operating voltage margin and cannot tolerate much reduction in their supply voltage. The margin is particularly small when the battery is nearing the end of its charge, so that its output voltage is somewhat reduced to begin with. Transmitting under these conditions can deprive the control and memory circuits of the voltage they need for reliable operation, resulting in interruptions of communication.

The problem is aggravated in wireless communication devices that transmit in a discontinuous manner, as in the TDMA (time-division multiple access) digital systems widely used for cellular telephone communications. When such a portable device is transmitting, its power amplifier does not operate continuously, but in a rapid-fire series of bursts, the power amplifier being switched on and off at a rate of, for example, fifty cycles per second. The supply voltage therefore fluctuates at the same rate, with accompanying voltage kicks caused by current gradients in stray inductances. Apart from the risk of incorrect operation of control and memory circuits, these voltage fluctuations can impede communication by causing noise at audible frequencies in receiving circuits.

SUMMARY OF THE INVENTION

It is accordingly an object of the present invention to provide power with suitable voltage stability to all load circuits in a portable electronic device.

Another object of the invention is to make efficient use of charge in a plurality of batteries.

A further object is to recharge a plurality of batteries in such a way that all of the batteries reach full charge at substantially the same time.

Yet another object is to reduce audible noise in portable time-division-multiplexed communication devices.

According to a first aspect of the invention, a portable electronic device comprises a plurality of load circuits, and a like plurality of batteries for independently supplying current to the respective load circuits.

According to a second aspect of the invention, the load circuits are supplied with current by power lines branching from a node coupled to a single battery. Each power line has a protective element that limits current flow to the corresponding load circuit.

According to a third aspect of the invention, a first load circuit is coupled to a first power line, and a second load circuit to a second power line. The first power line is coupled through a first switch to a first battery, the second power line is coupled through a second switch to a second battery, and the first and second power lines are mutually coupled through a third switch. The switches are controlled according to the states of discharge of the batteries.

According to a fourth aspect of the invention, a battery charger charges a plurality of batteries by supplying charging current to them in turn for intervals of time proportional to the uncharged capacities of the batteries, repeating this procedure until all of the batteries reach full charge.

DETAILED DESCRIPTION OF THE INVENTION

Embodiments of the invention will now be described with reference to the attached illustrative drawings.

Figure 1:
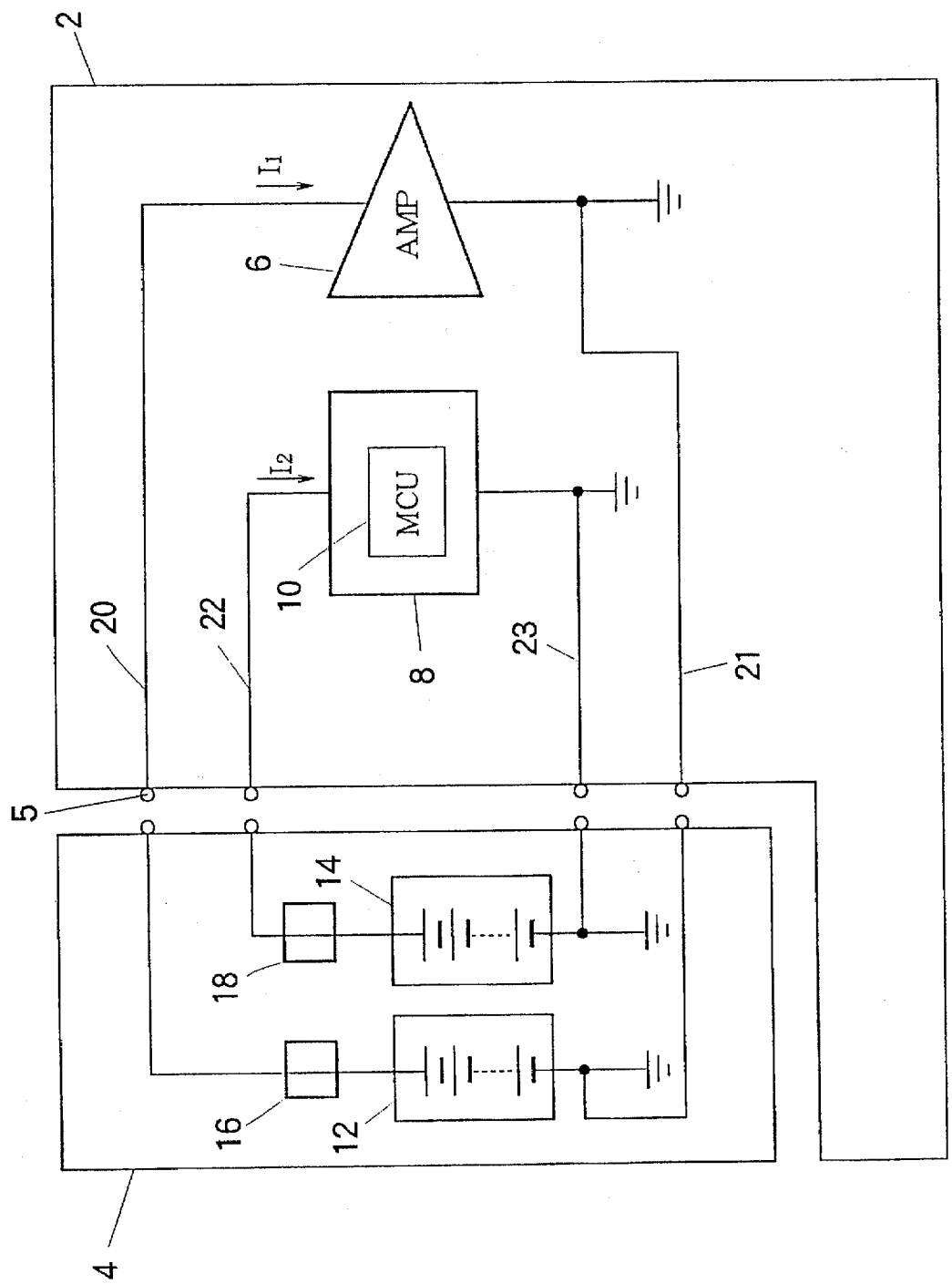
FIG. 1 is a block diagram of a portable electronic device illustrating the first aspect of the invention.

Referring to FIG. 1, a first embodiment of the invention is a TDMA portable wireless communication device comprising a main unit 2 and battery pack 4. The battery pack 4 is detachably mounted in the main unit 2, electrical coupling being effected through contact terminals 5.

The circuits in the main unit 4 can be divided into a burst load, comprising a power amplifier 6, and a collection of non-burst loads 8. One of the non-burst loads 8 is a microcontroller unit (MCU) 10. Other non-burst loads, not explicitly indicated, include indicator and receiving circuits. The MCU 10 controls the other loads, including the power amplifier 6, through control lines (not shown).

The battery pack 4 comprises a first battery 12 and a second battery 14, each consisting of one or more cells. The cells may be either secondary or primary cells, i.e. the batteries may be either rechargeable or non-rechargeable. The two batteries 12 and 14 need not have the same number of cells, their output voltages need not be the same, and their charge capacities may be different. For example, the first battery 12 may have a higher output voltage and larger charge capacity than the second battery 14.

In the drawings, each of the two batteries 12 and 14 is shown as comprising a plurality of cells connected in series between two terminals, but the batteries need not be structured in this way. In either battery, the cells may be connected in parallel between the two terminals, or a mixture of serial and parallel interconnections may be used. Either battery may furthermore consist of a single cell not connected to any other cells.

The first and second batteries 12 and 14 are coupled through respective protective elements such as fuses 16 and 18 to the main unit 4. A separate pair of contact terminals 5 is used for each battery. The first battery 12 supplies power to the power amplifier 6 through a first power line 20 and ground return line 21 in the main unit 2, while the second battery 14 supplies power to the non-burst loads 8 through a second power line 22 and ground return line 23. In the drawing, the ground symbol is used to identify the negative terminals of the batteries, and the negative sides of the load circuits in the main unit 2.

Next the operation of this device will be described, with reference to FIGS. 2 to 5.

Figure 2:
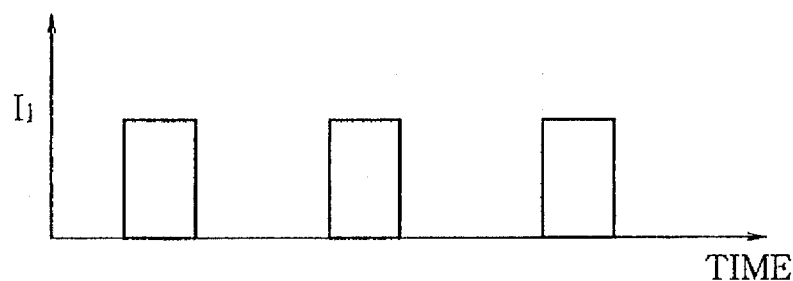
FIG. 2 is graph illustrating current drawn by the first load circuit in FIG. 1.

FIG. 2 shows the current $I_1$ drawn by the power amplifier 6 while transmitting. Time is indicated on the horizontal axis and current on the vertical axis. Due to time-division multiplexing, considerable current is drawn in a burst lasting, for example, 6.7 milliseconds, then substantially no current is drawn for a succeeding interval of, for example, 13.3 milliseconds, after which the same cycle repeats.

Figure 3:
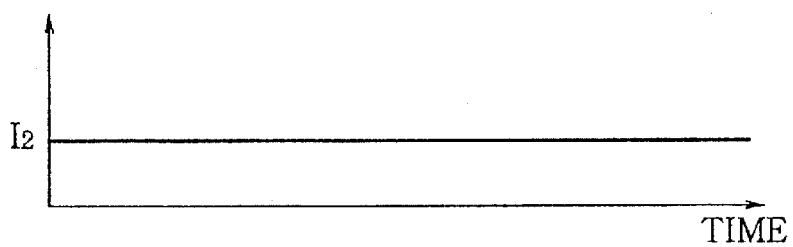
FIG. 3 is graph illustrating current drawn by the second load circuit in FIG. 1.

FIG. 3 shows the current $I_2$ drawn by the non-burst loads 8, the horizontal and vertical axes having the same meaning as in FIG. 2. Current $I_2$ is drawn at a steady rate with substantially no variations.

Figure 4:
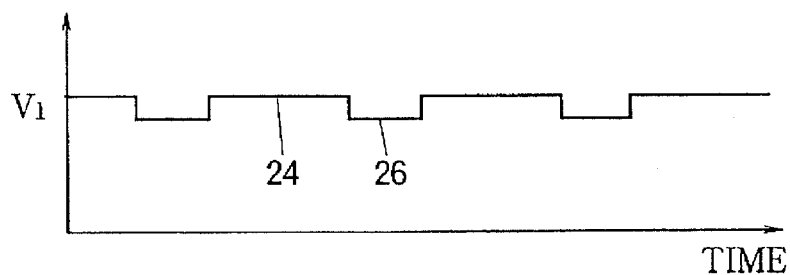
FIG. 4 is a graph illustrating the voltage supplied to the first load circuit in FIG. 1.

FIG. 4 shows the voltage $V_1$ supplied to the power amplifier 6. Time is indicated on the horizontal axis and voltage on the vertical axis. During intervals 24 when no current is being drawn, this voltage $V_1$ has a certain nominal value. During intervals 26 when bursts of current $I_1$ are being drawn, voltage $V_1$ is reduced by voltage drops due to current flow across the wiring resistance of the first power line 20 and ground return line 21, across the contact resistance of the contacts 5 coupled to the first power line 20 and ground return line 21, across the resistance of fuse 16 in the battery pack 4, across wiring resistance within the battery pack 4, and across the internal resistance of first battery 12 itself.

Figure 5:
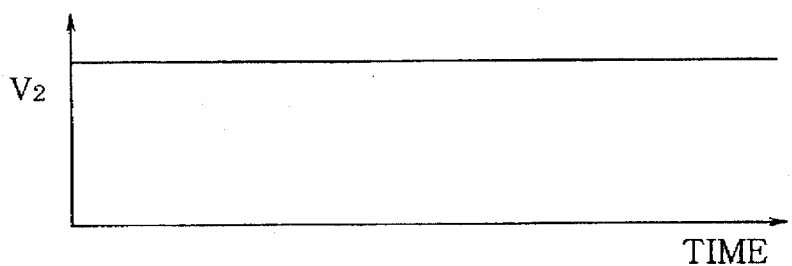
FIG. 5 is a graph illustrating the voltage supplied to the second load circuit in FIG. 1.

FIG. 5 shows the voltage $V_2$ supplied to the non-burst loads 8, the horizontal and vertical axes having the same meaning as in FIG. 4. Because current $I_2$ is drawn at a steady rate, voltage $V_2$ also remains steady. Since the first and second batteries 12 and 14 are coupled to their respective loads through different fuses 16 and 18, different power lines 20 and 22, and different ground return lines 21 and 23, voltage $V_2$ is unaffected by the variations in voltage $V_1$. There is no risk that voltage fluctuations arising from the power amplifier 6 will interfere with the operation of the MCU 10 or generate noise in receiving circuits.

Figure 6:
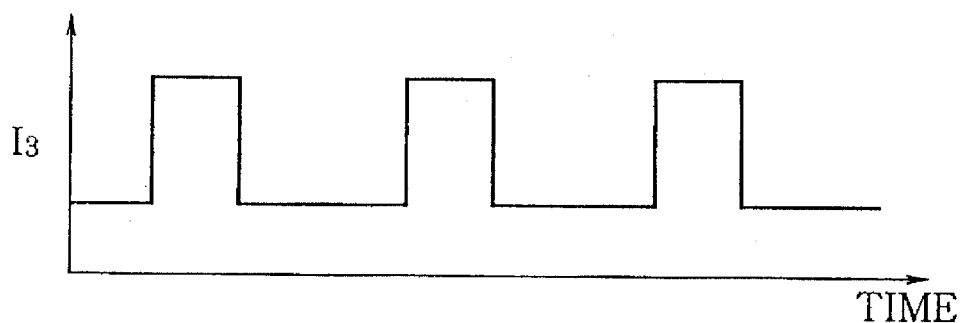
FIG. 6 is a graph illustrating the total current drawn by both load circuits in FIG. 1.

FIG. 6 shows the total current $I_3$ drawn by the power amplifier 6 and non-burst loads 8. The horizontal and vertical axes have the same meaning as in FIG. 2. FIGS. 2, 3, and 6 are related by the equation $I_1+I_2=I_3$.

Figure 7:
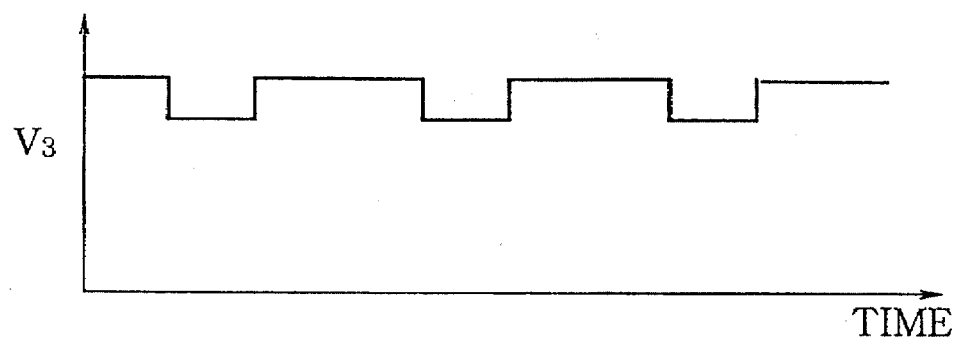
FIG. 7 is a graph illustrating supply voltage fluctuations that would occur if both load circuits in FIG. 1 shared the same power supply.

FIG. 7 shows how the supply voltage $V_3$ would vary if the total current $I_3$ were drawn from a single battery through a single fuse, as in a conventional portable electronic device. The bursts of current $I_1$ drawn by the power amplifier 6 would cause the common supply voltage $V_3$ to vary in the same general way that $V_1$ varied in FIG. 4, but these variations would now be passed on to the MCU 10 and receiving circuits, causing noise and potential malfunctions.

As a comparison of FIG. 7 with FIGS. 4 and 5 shows, these problems are completely eliminated in the first embodiment, which can thus provide reliable and relatively noise-free communication.

Figure 8:
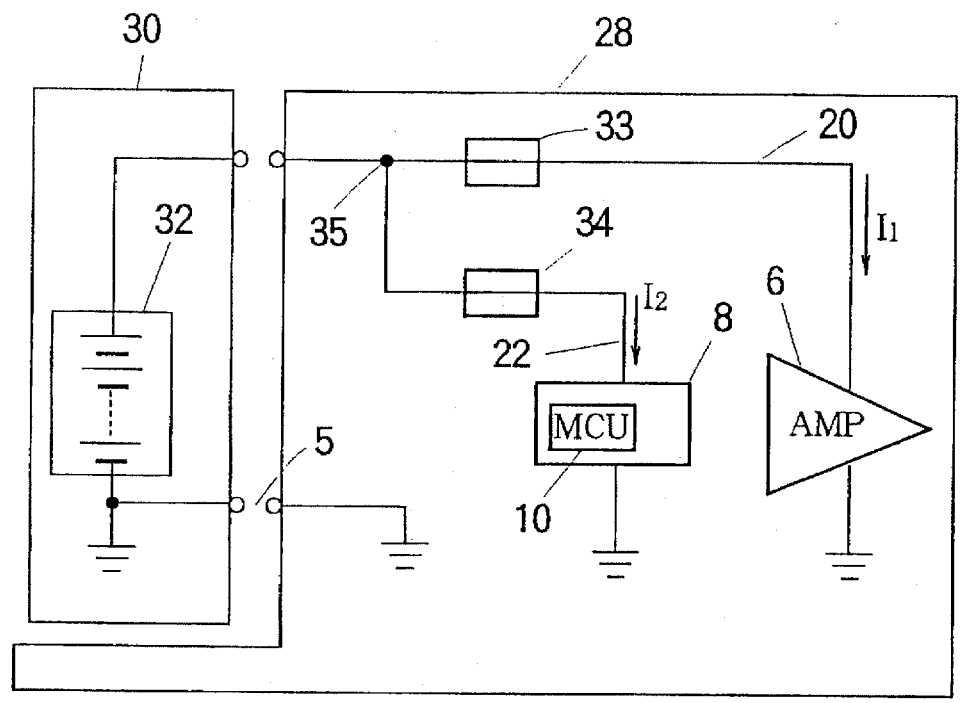
FIG. 8 is a block diagram of a portable electronic device illustrating the second aspect of the invention.

FIG. 8 shows a second embodiment of the invention, again a portable TDMA wireless communication device comprising a main unit and battery pack. This time the battery pack 30 has a single battery 32, coupled to the main unit 28 by a single set of contact terminals 5. The main unit 28 has the same power amplifier 6 and non-burst loads 8 as in the first embodiment, and two protective elements such as fuses 33 and 34.

The power supply line is branched at a node 35 in the main unit 28, one branch power line 20 leading through fuse 33 to the power amplifier 6, while the other branch power line 22 leads through fuse 34 to the non-burst loads 8. All the load circuits, including the power amplifier 6, have a common ground return, which is indicated by the ground symbol without explicitly shown the ground interconnections. The ground return from the power amplifier 6 is preferably connected to the ground returns from other loads at a single point near the contact terminal 5 between the main unit 28 and battery pack 30.

When the power amplifier 6 is switched on and draws current $I_1$, there will be a voltage drop due to current flow through various resistances as described in the first embodiment. Of this voltage drop, the drop occurring in the fuse 33 and power line 20, between node 35 and power amplifier 6, will not directly affect the non-burst loads 8. The non-burst loads 8 will be directly affected only by the voltage drop occurring in resistances that are common to the two loads, from the battery 32 up to node 35 and in common ground return lines. In particular, the non-burst loads 8 will be substantially unaffected by the voltage drop across fuse 33, which accounts for a major part of the total voltage drop due to current $I_1$ drawn by the power amplifier 6, and by voltage kicks due to the inductance of the fuse 33 when the power amplifier 6 is switched on and off.

In the second embodiment the non-burst loads 8 are not completely isolated from supply voltage variations caused by the power amplifier 6, but they are less affected than they would be if the power amplifier 6 and non-burst loads 8 were supplied with power through a common fuse, as in the prior art. Compared with the first embodiment, the second embodiment provides somewhat less noise immunity for the MCU 10 and other non-burst load circuits, but has the advantage that the battery pack 30 can be smaller and lighter, since it contains only one battery 32.

Another difference between the first and second embodiments is that in the second embodiment, the same battery voltage is necessarily supplied to both the power amplifier 6 and the non-burst loads 8. Thus while the second embodiment permits a smaller and lighter battery pack 30, it provides less design flexibility.

Figure 9:
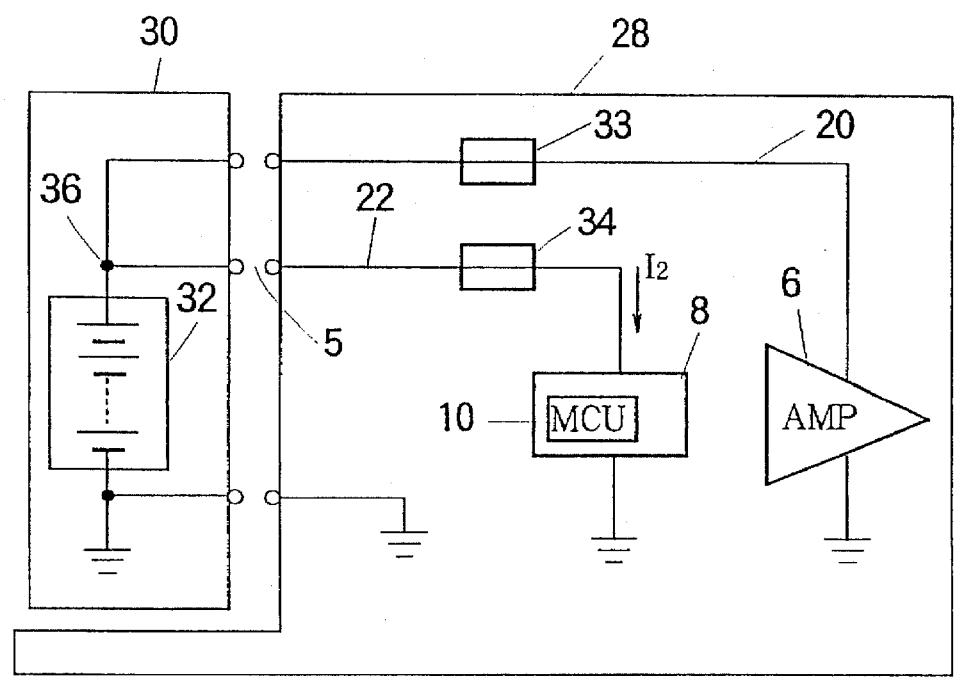
FIG. 9 is a block diagram of another portable electronic device illustrating the second aspect of the invention.

FIG. 9 shows a third embodiment, using the same reference numerals as in FIG. 8 for identical elements. The difference between the second and third embodiments is that in the third embodiment, the power lines are branched at a node 36 disposed in the battery pack 30, instead of in the main unit 28, and power is supplied to the power amplifier 6 and non-burst loads 8 through separate contact terminals 5.

This arrangement further reduces the effect of current $I_1$ drawn by the power amplifier 6 on the voltage supplied to the non-burst loads 8. The effect is now limited to the voltage variations due to the flow of current $I_1$ through the internal resistance of the battery 32 and in common ground lines. In particular, the flow of current $I_1$ across the resistance and inductance of the contact terminals 5 does not directly affect the non-burst loads 8.

The effect could be further reduced by providing separate ground return circuits, branched at a point close to the negative terminal of the battery 32.

Compared with the second embodiment, the third embodiment provides the same advantage of a compact battery pack, while improving protection of the non-burst loads from supply voltage fluctuations. The only additional requirement is an extra pair of contact terminals 5.

A further advantage of the second and third embodiments over the first embodiment is that all battery charge can be used, because the charge in the battery 32 is available to both the power amplifier 6 and non-burst loads 8. In the first embodiment it is not always possible to use all the charge in the batteries, for the following reason.

Referring again to FIG. 1, if the first embodiment is used exclusively in a non-transmitting mode for an extended time, the second battery 14 may run down, forcing the user to replace or recharge the battery pack 4 while considerable charge remains in the first battery 12. Conversely, during prolonged transmitting periods the first battery 12 may run down while considerable charge remains in the second battery 14. In either case, the remaining battery charge cannot be used.

Figure 10:
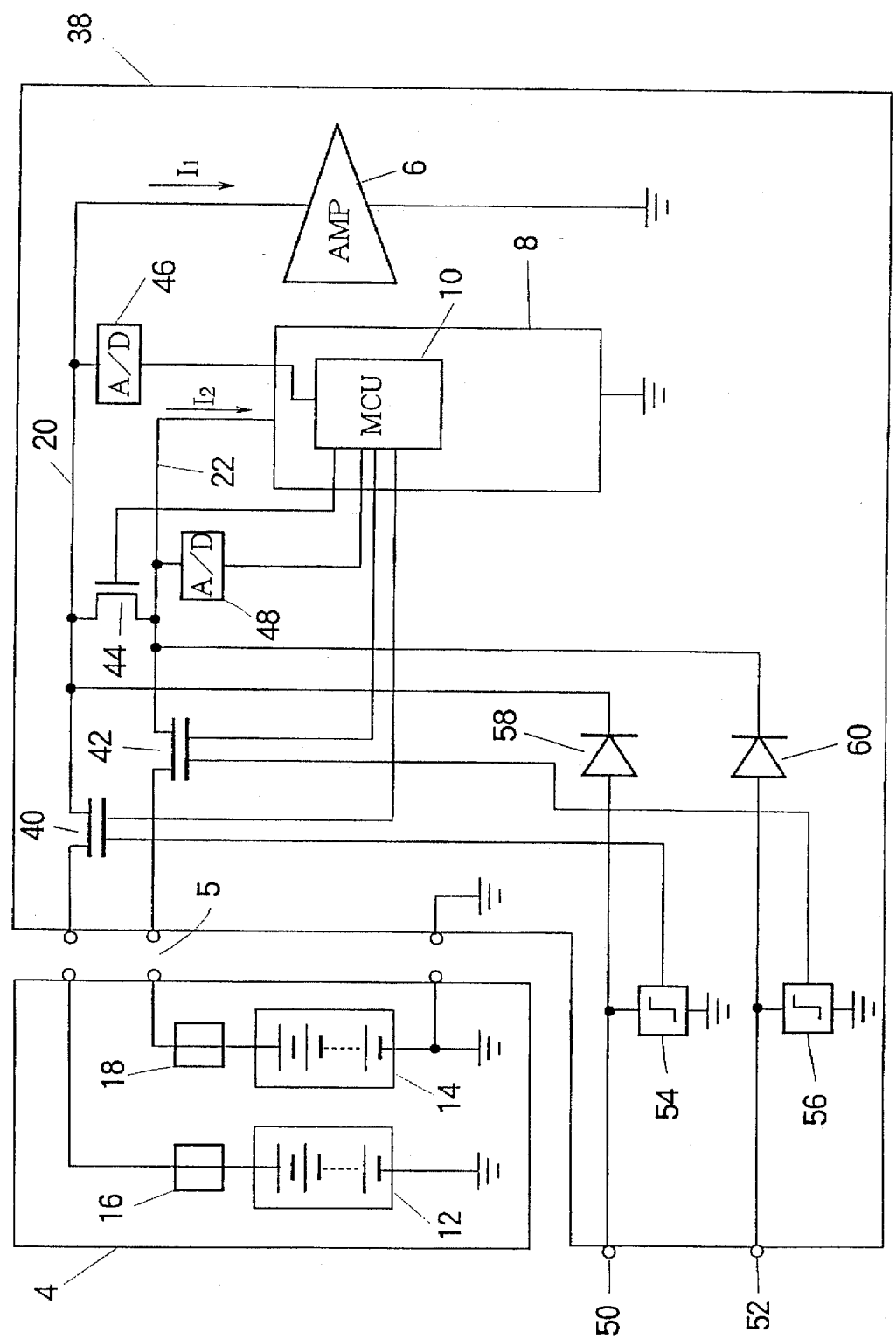
FIG. 10 is a block diagram of a portable electronic device illustrating the third aspect of the invention.
Figure 11:
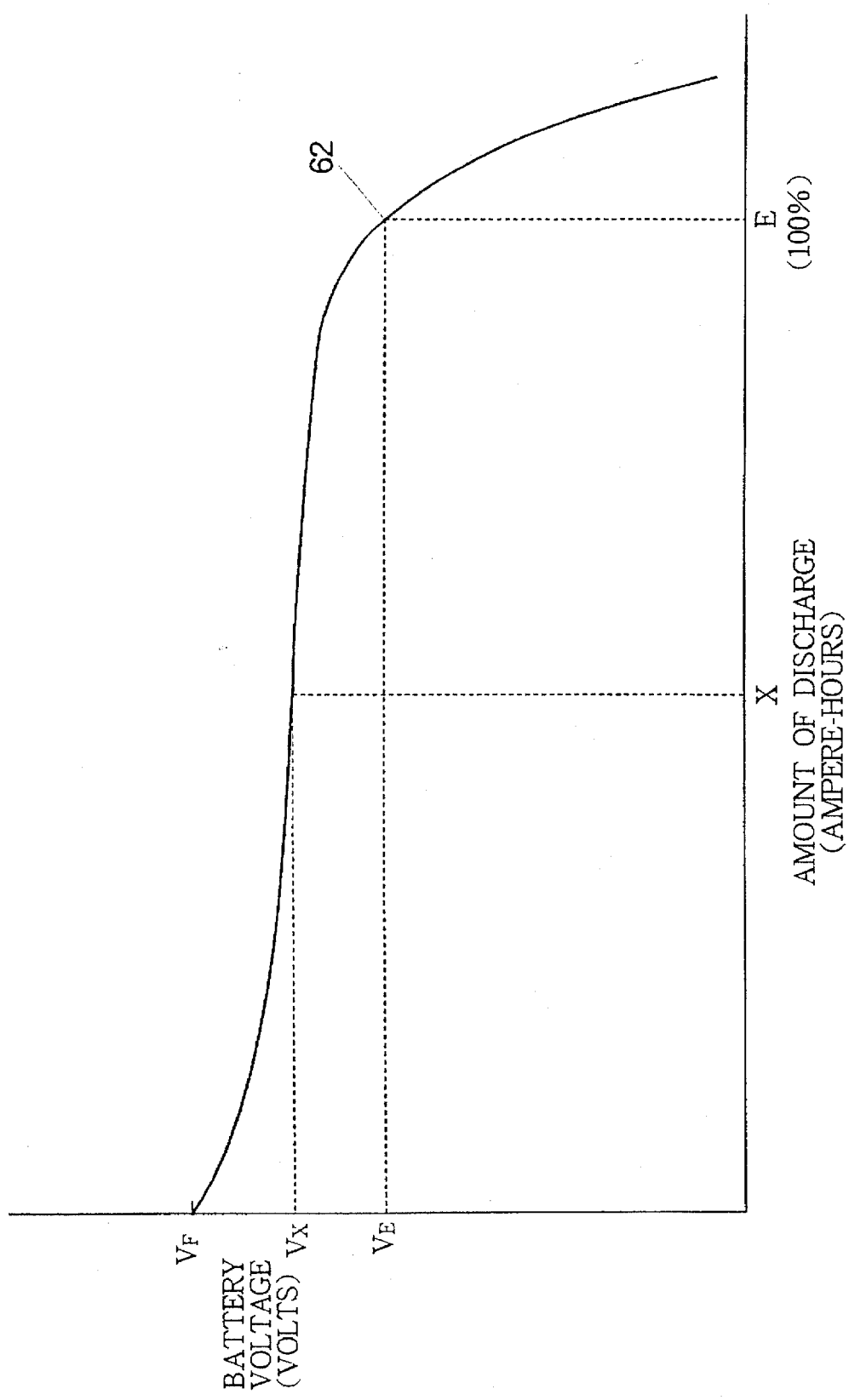
FIG. 11 is a graph illustrating the discharge curve of a battery.

FIG. 10 shows a fourth embodiment, which is adapted to deal with this problem of unusable charge. The fourth embodiment is also designed to operate either on its battery pack, or on an external power source such as commercial power supplied through an adapter plugged into a wall socket.

The battery pack 4 in the fourth embodiment is the same as the battery pack 4 in the first embodiment, comprising first and second batteries 12 and 14 and first and second fuses 16 and 18. For simplicity, common ground returns are indicated by ground symbols, but separate ground returns can of course be used as in the first embodiment. The battery pack 4 is electrically coupled to the main unit 38 by contact terminals 5.

The main unit 38 comprises the same power amplifier 6 and non-burst loads 8 as in the first embodiment, the non-burst loads 8 including an MCU 10. Power is supplied through a first power line 20 and second power line 22, again as in the first embodiment. In addition, the main unit 38 has a first switch 40 controlling the first power line 20, a second switch 42 controlling the second power line 22, a third switch 44 interconnecting the first and second power lines 20 and 22, a pair of voltage detectors such as analog-to-digital (A/D) converters 46 and 48 connected to respective first and second power lines 20 and 22, a pair of external power terminals 50 and 52, a pair of voltage detectors such as voltage comparators 54 and 56 connected to respective external power terminals 50 and 52, and a pair of diodes 58 and 60 connected to respective external power terminals 50 and 52 and respective power lines 20 and 22.

Switches 40, 42, and 44 are field-effect transistors. The MCU 10 is coupled to the gate electrodes of switches 40, 42, and 44, and to the A/D converters 46 and 48. The voltage comparators 54 and 56 are coupled to the gate electrodes of switches 40 and 42. To turn on, the first switch 40 requires active inputs from both voltage comparator 54 and the MCU 10, and the second switch 42 requires active inputs from both voltage comparator 56 and the MCU 10. Active means, for example, ground-level inputs, if the switches 40 and 42 are p-channel transistors.

External power terminal 50 provides substantially the same voltage as the first battery 12. External power terminal 52 provides substantially the same voltage as the second battery 14. These two voltages need not be the same. Ground returns to the external power source have been omitted to simplify the drawing.

Next the operation of this fourth embodiment will be described, with reference to FIGS. 10 to 13.

Referring first to FIG. 10, voltage comparators 54 and 56 sense the voltages at terminals 50 and 52, and control the first and second switches 40 and 42. When an adequate voltage is detected at external power terminal 50, voltage comparator 54 turns off the first switch 40, so that power line 20 is powered from terminal 50 and not from the first battery 12. Similarly, when adequate voltage is detected at external power terminal 52, voltage comparator 56 turns off the second switch 42, so that power line 22 is powered from terminal 52 and not from the second battery 14.

When an adequate voltage is not detected at external power terminal 50 or 52, voltage comparator 54 or 56 outputs an active signal, so that the corresponding switch 40 or 42 can be turned on. Diodes 58 and 60 then prevent reverse current flow to terminal 50 or 52.

A/D converters 46 and 48 report the voltages on power lines 20 and 22 to the MCU 10. The meanings of these voltages will be explained with reference to FIG. 11, which shows the discharge curve of, for example, the first battery 12. The horizontal axis indicates the amount of current (in ampere-hours) that has been drawn from the battery, i.e. the amount of discharge that has taken place. The vertical axis indicates the battery's output voltage.

When fully charged, the battery delivers a certain output voltage $V_F$. As the battery discharges, its output voltage decreases, quickly at first, then more slowly, then quickly again. For each amount X of discharge, there is accordingly a unique output voltage $V_X$.

At time E, when little charge is left, the output voltage starts to drop very steeply. The point at which this steep drop begins is referred to as the knee 62 of the discharge curve. If the battery is a rechargeable battery consisting of secondary cells, it should not be discharged past the knee 62, since deep discharge may shorten the battery's overall useful life. The battery is accordingly considered to be fully discharged at time E, and is not used when its output voltage falls below $V_E$.

Discharge is often measured in percent of rated discharge capacity. Thus in FIG. 11, E represents 100%.

Figure 12:
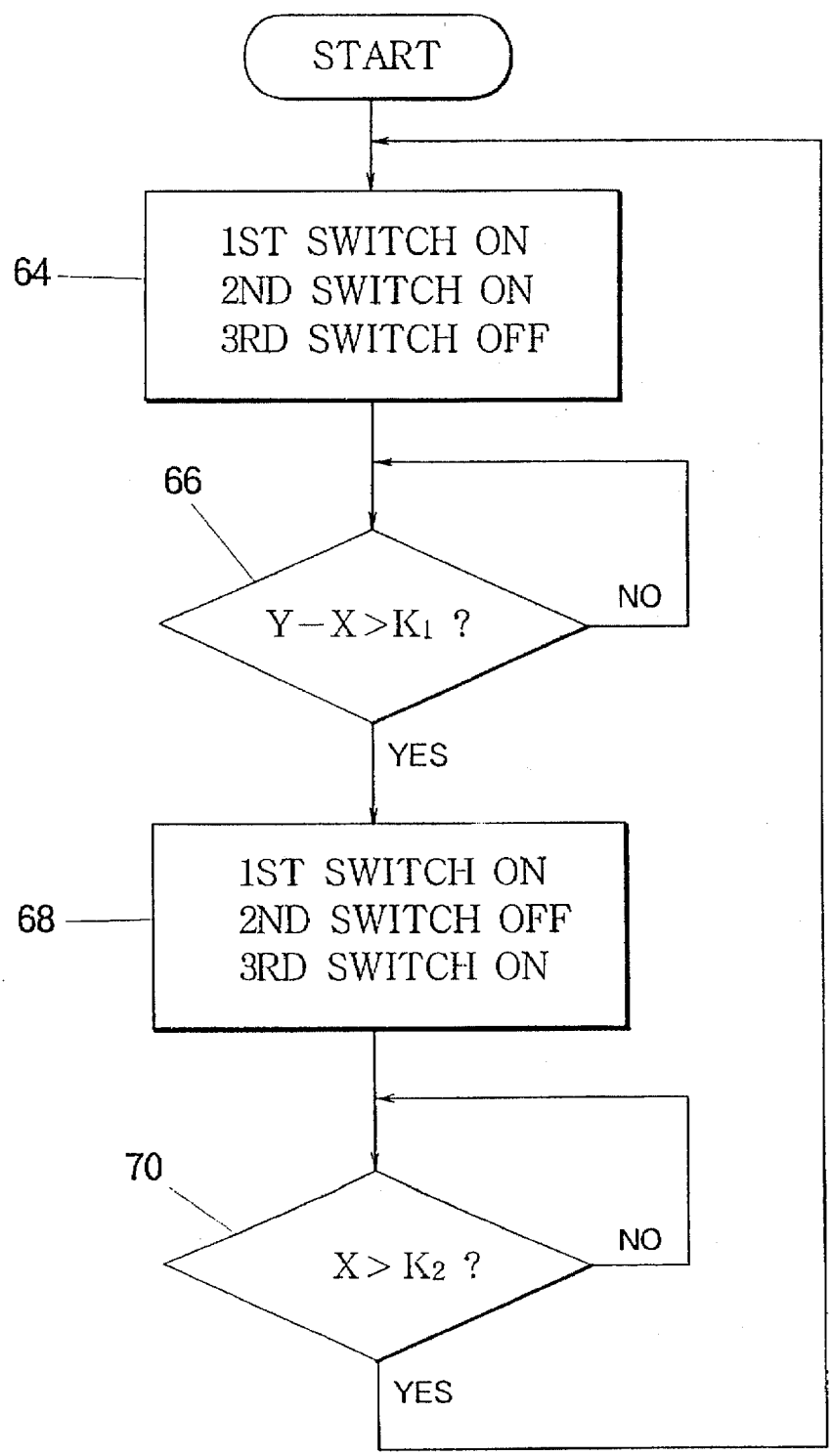
FIG. 12 is a flowchart illustrating control of the switches in FIG. 10 in a non-transmitting mode.
Figure 13:
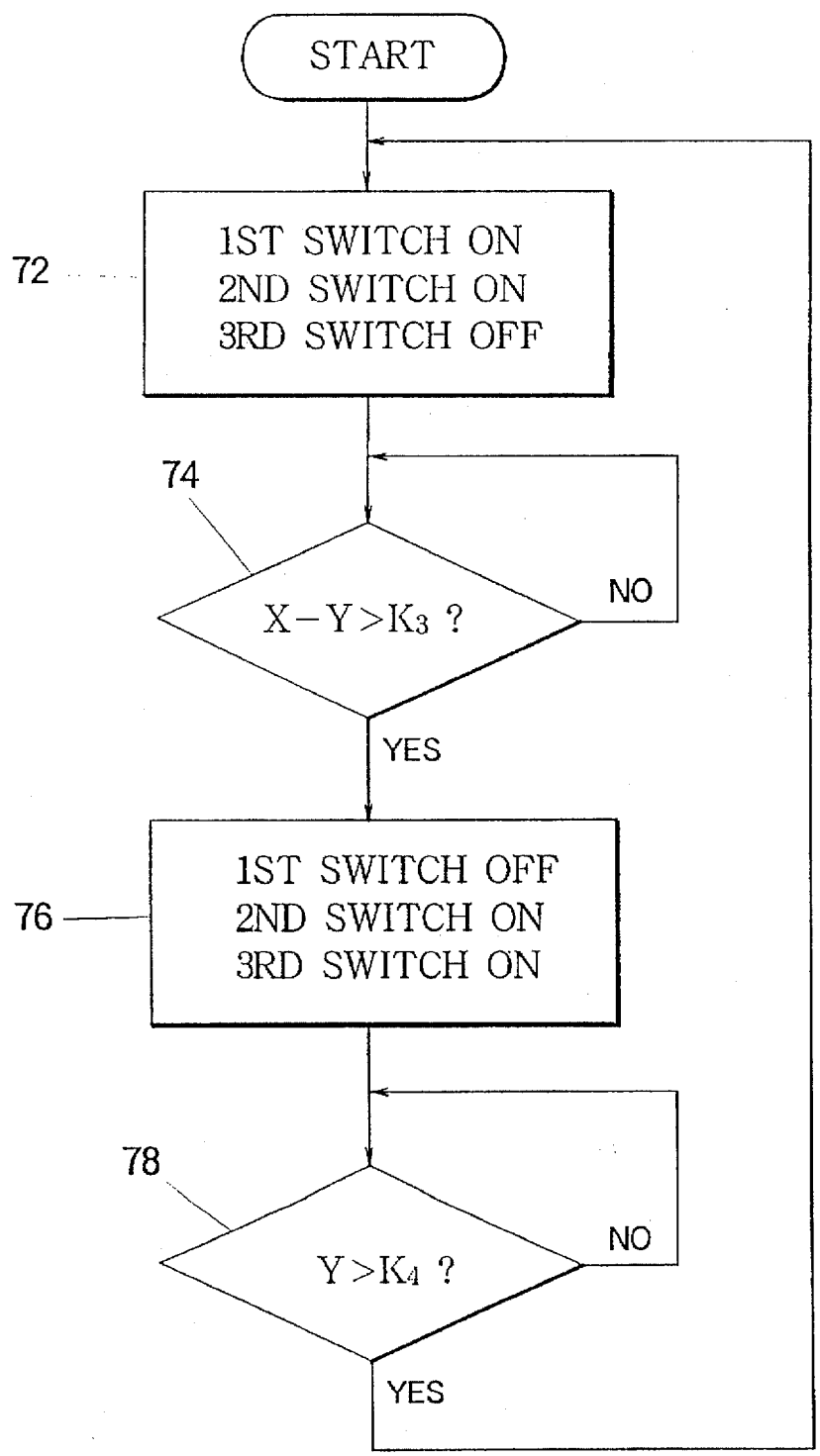
FIG. 13 is a flowchart illustrating control of the switches in FIG. 10 in a transmitting mode.

The MCU 10 is programmed to control switches 40, 42, and 44 according to the amount of battery discharge indicated by the voltages detected by A/D converters 46 and 48. The basic idea is to disconnect one battery whenever it becomes significantly more discharged than the other battery. However, slightly different control schemes are used in transmitting modes, in which the power amplifier 6 is being switched on and off in a burst manner, and in non-transmitting modes, when the power amplifier 6 is switched off and draws little or no current. To determine whether to use the control scheme for the transmitting mode or non-transmitting mode, the MCU 10 continually performs the comparisons in step 66 of FIG. 12 and step 74 of FIG. 13 until one of the two steps is determined to be "yes." If step 66 is determined to be "yes," the control scheme for the non-transmitting mode in FIG. 12 is used, and if step 74 is determined to be "yes," the control scheme for the transmitting mode in FIG. 13 is used. Once the control scheme of either FIGS. 12 or 13 returns to steps 64 or 72, respectively, the MCU 10 renews its continual performance of the comparisons in steps 66 and 74.

FIG. 12 shows a control scheme for a non-transmitting mode, illustrating the operation when external power is not supplied to terminals 50 and 52. In this state the voltage comparators 54 and 56 output active signals, so that the first and second switches 40 and 42 can be turned on or off under control of the MCU 10.

In the first step 64, the MCU 10 turns on the first and second switches 40 and 42 and turns off the third switch 44, so the power amplifier 6 is powered by the first battery 12 and the non-burst loads 8 by the second battery 14.

In the second step 66 the MCU 10 monitors the percent amount of discharge X of the first battery 12 and the percent amount of discharge Y of the second battery 14, as indicated by the outputs of the A/D converters 46 and 48. As long as Y−X is equal to or less than a first threshold value $K_1$, switches 40, 42, and 44 are left in their existing states.

If Y−X>$K_1$, however, meaning that the second battery 14 has discharged farther than the first battery 12 by more than $K_1$ percent, in the next step 68 the second switch 42 is turned off and the third switch 44 is turned on. The first switch 40 is also left on, so both the power amplifier 6 and non-burst loads 8 are now powered by the first battery 12. Since the power amplifier draws little or no current $I_1$, the supply voltage of the non-burst loads 8 is not disrupted.

In the next step 70 the MCU 10 monitors X again. As long as X is equal to or less than a second threshold $K_2$, switches 40, 42, and 44 are left at their existing settings. If X>$K_2$, however, the switches are returned to their initial settings in the first step 64, so that the non-burst loads 8 are again powered by the second battery 14.

Under this control scheme, if no transmission occurs for a prolonged time, the MCU 10 can extend the operating life of the device by borrowing charge from the first battery 12 to power the non-burst loads 8. Borrowing begins when the discharge difference between the two batteries exceeds $K_1$ and ends when the percent amount of discharge X in the first battery 12 becomes less than $K_2$, always leaving sufficient charge in the first battery 12, to provide for the possible start of transmission.

FIG. 13 shows a control scheme for use in transmitting modes, again when external power is not supplied to terminals 50 and 52.

In the first step 72, the first and second switches 40 and 42 are both turned on and the third switch 44 is turned off, so the power amplifier 6 is powered by the first battery 12 and the non-burst loads 8 by the second battery 14.

In the second step 74 the MCU 10 monitors the percent amounts of discharge X and Y of the first and second batteries 12 and 14. As long as X−Y is equal to or less than a third threshold $K_3$, switches 40, 42, and 44 are left in their existing states. The third threshold $K_3$ is preferably a fairly high threshold, such as 50%.

If X−Y>$K_3$, indicating that charge in the first battery 12 may have become seriously low while ample charge remains in the second battery 14, then in the next step 76 the first switch 40 is turned off and the third switch 44 is turned on. The second switch 42 is left on, so both the power amplifier 6 and non-burst loads 8 are now powered by the second battery 14. Since the second battery has ample charge remaining, there is still a safe operating margin for the non-burst loads 8, despite supply voltage fluctuations caused by bursts of current $I_1$. Although these bursts may cause noise, that is preferable to having transmission cut off by a run-down first battery 12.

In the next step 78 the MCU 10 monitors the discharge Y of the second battery 14. As long as Y is equal to or less than a fourth threshold $K_4$, such as 80%, switches 40, 42, and 44 are left at their existing settings and the power amplifier 6 continues to draw current from the second battery 14. If Y>$K_4$, however, the switches are returned to their initial settings in the first step 72, so that the power amplifier 6 is again powered by the first battery 12. Transmission can then continue until the first battery 12 is fully discharged.

Under this control scheme, while transmitting, the device normally draws current from both batteries as in the first embodiment. If the first battery 12 becomes excessively discharged, however, the device falls back to the conventional mode of single-battery operation, using the second battery 14, thereby extending the possible transmission time. This fall-back mode is entered only if the discharge difference between the two batteries is very large, and ends while the second battery 14 still retains enough charge to supply an adequate voltage to the non-burst loads 8.

Figure 14:
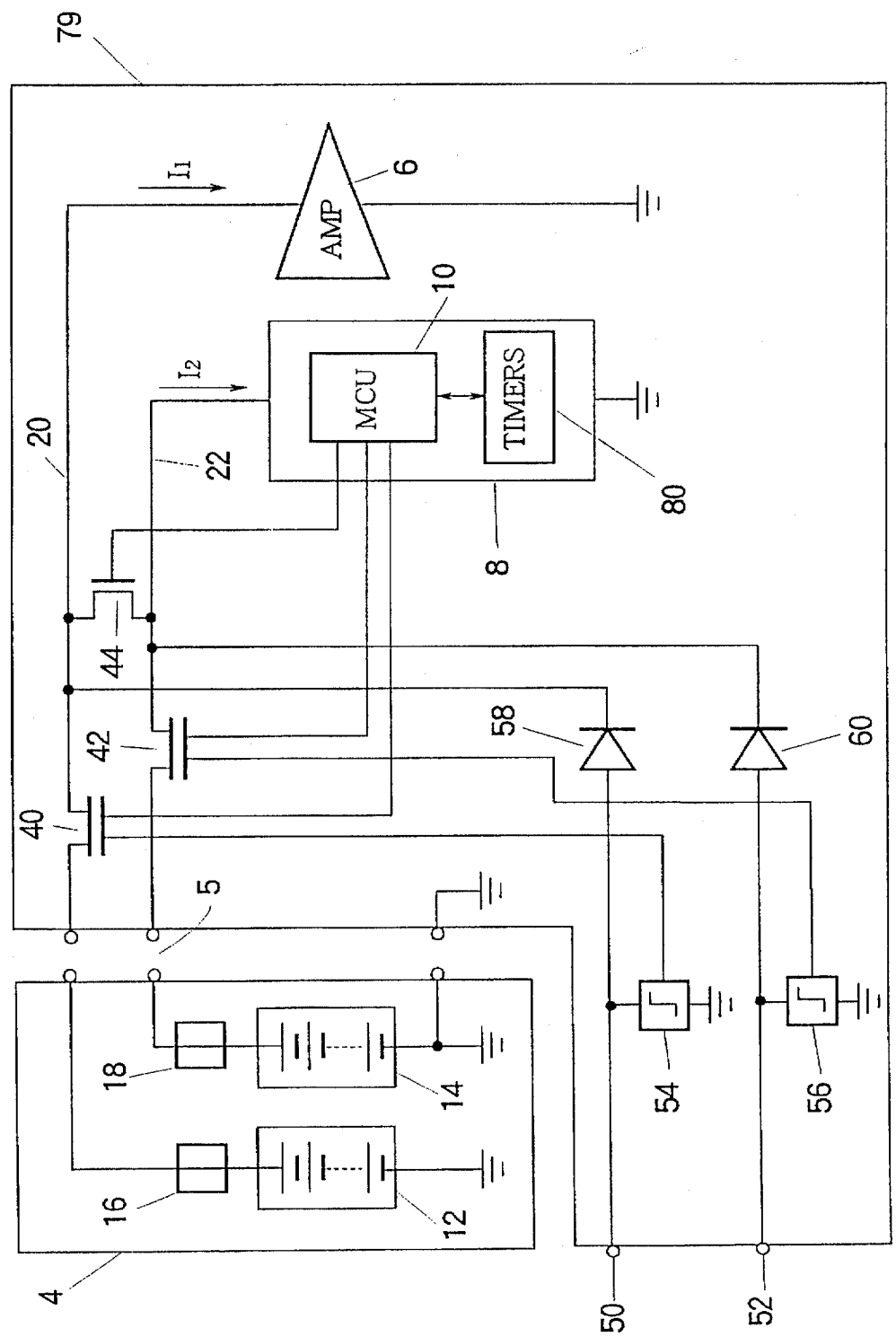
FIG. 14 is a block diagram of another portable electronic device illustrating the third aspect of the invention.

FIG. 14 illustrates a fifth embodiment of the invention, using the same reference numerals as in FIG. 10 to indicate elements that are identical to elements in the fourth embodiment. The difference between these two embodiments is that the main unit 79 in the fifth embodiment uses timers to detect battery discharge. The main unit 79 thus has a timer module 80 coupled to the MCU 10, instead of the A/D converters 46 and 48 of the fourth embodiment.

If the MCU 10 has built-in timers, these can of course be used instead of an external timer module 80.

Knowing the current drawn by each load, by using the timer module 80 to measure the time for which loads coupled to the first battery 12 are switched on, the MCU 10 determines the amount of discharge X of the first battery 12. Similarly, by measuring the time for which loads coupled to the second battery 14 are switched on, the MCU 10 determines the amount of discharge Y of the second battery 14. The values of X and Y are then used to carry out the control schemes of FIGS. 12 and 13.

Compared with the fourth embodiment, the fifth embodiment has the advantage of not requiring A/D converters to detect battery discharge. A further advantage is that discharge can be measured more accurately by measuring discharge time than by measuring voltage. Referring again to FIG. 11, the near-flatness of the battery discharge curve makes the voltage method of discharge detection comparatively insensitive, particularly in the middle discharge range. Timer-based sensing is more accurate in this middle range, which is where most of the sensing in the control schemes shown in FIGS. 12 and 13 is carried out.

Figure 15:
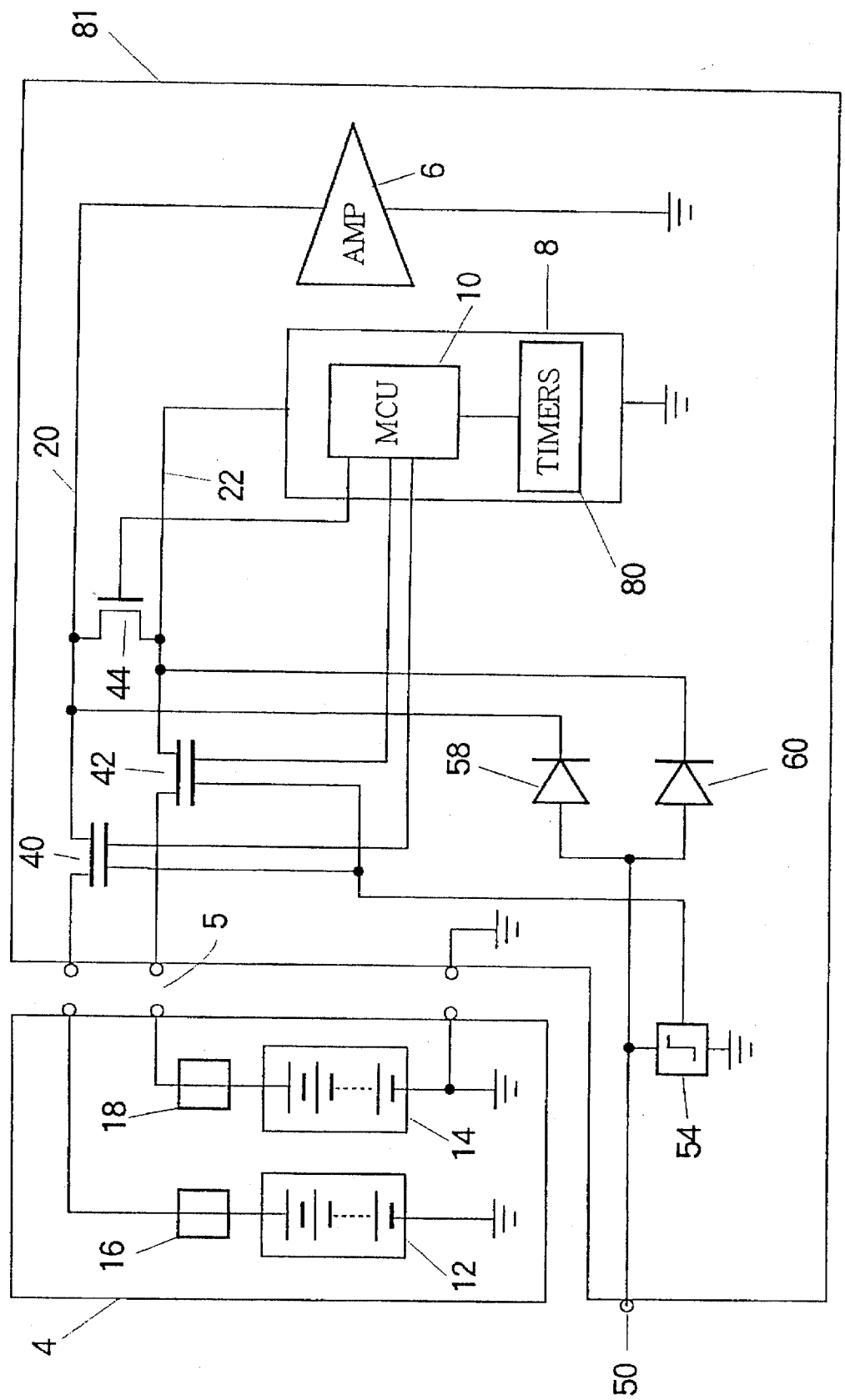
FIG. 15 is a block diagram of another portable electronic device illustrating the third aspect of the invention.

FIG. 15 illustrates a sixth embodiment of the invention, using the same reference numerals as in FIG. 14 to identify equivalent elements. The only difference between the fifth and sixth embodiments is that a single external power terminal 50 supplies power to both power lines 20 and 21 in the main unit 81. The power amplifier 6 and non-burst loads 8 must accordingly be designed to operate on the same supply voltage. Aside from this restriction, operation is the same as in the fourth embodiment, so a detailed description will be omitted.

External power supplies generally experience smaller voltage drops due to current drain than do battery packs. When the power amplifier 6 and non-burst loads 8 are both powered from the external terminal 50, accordingly, current $I_1$ drawn by the power amplifier 6 does not significantly affect the supply voltage. Note that this current flow bypasses the fuses 16 and 18 and contact terminals 5, which are major sources of voltage fluctuations in battery-powered operation.

The fourth embodiment can also be adapted to use a single external power supply terminal.

The preceding embodiments can employ either rechargeable battery packs with secondary cells, or non-rechargeable battery packs with primary cells. When a rechargeable battery pack with multiple batteries is used, it is further necessary to provide an efficient method of recharging the batteries.

Figure 16:
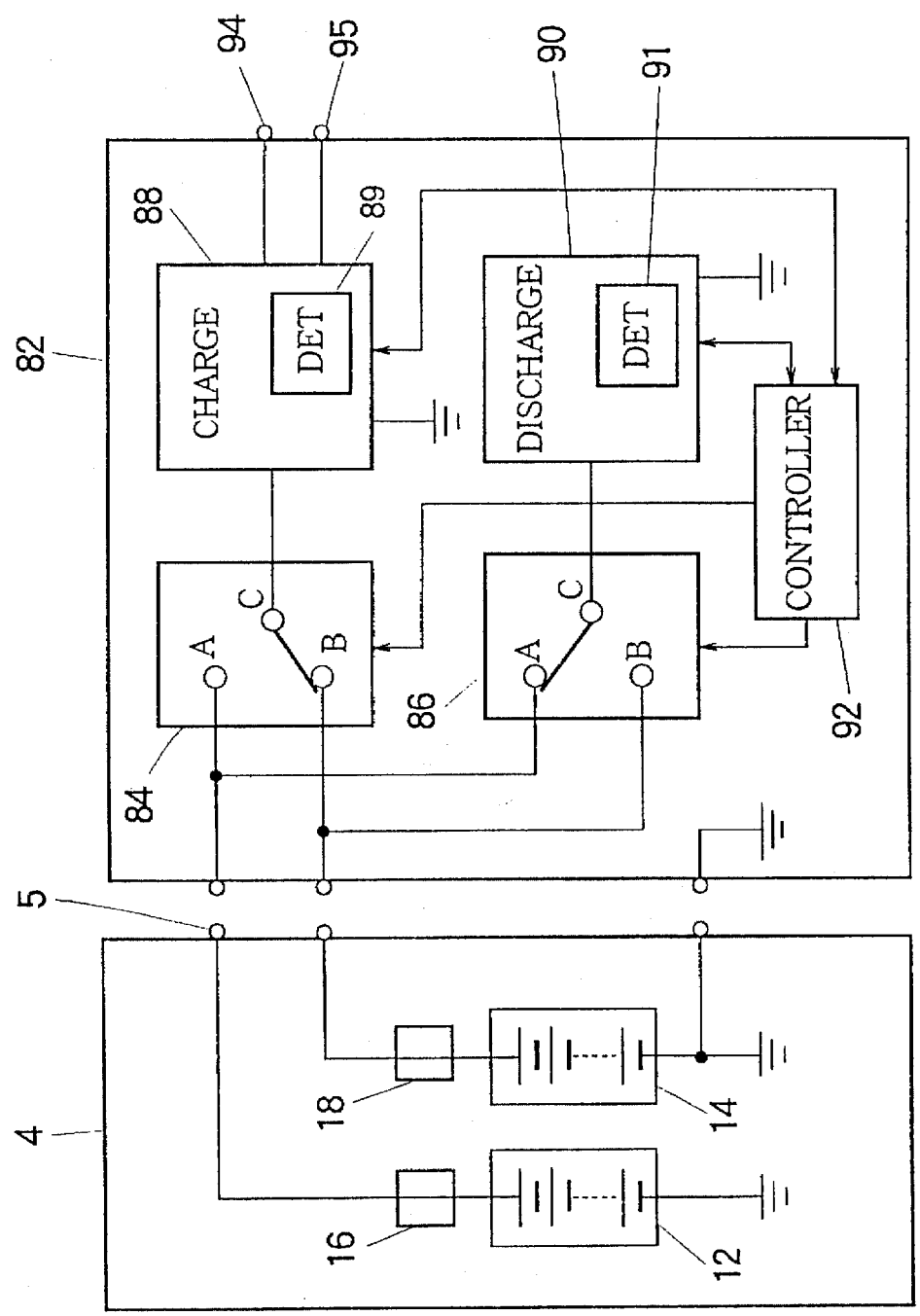
FIG. 16 is a block diagram of a battery charger illustrating the fourth aspect of the invention.

FIG. 16 shows a novel battery charger 82 that can be used to recharge the battery pack 4 of the first, fourth, fifth, or sixth embodiment. The battery charger 82 has a charge switch 84 and a discharge switch 86, each comprising internal terminals A, B, and C. In each switch, internal terminal A is coupled, via contact terminals 5, to the first battery 12 in the battery pack 4, while terminal B is coupled to the second battery 14.

Terminal C in the charge switch 84 is connected to a charging unit 88 having an internal discharge detector 89. Terminal C in the discharge switch 86 is connected to a discharging unit 90 having an internal discharge detector 91. The discharge detectors 89 and 91 may comprise A/D converters or voltage comparators which sense positions on the discharge curves of the batteries, as explained in the fourth embodiment. The switches 84 and 86 and charging and discharging units 88 and 90 are controlled by a controller 92 according to the discharge states sensed by the discharge detectors 89 and 91. The battery charger 82 has external terminals 94 and 95 that supply current to the charging unit 88.

The battery charger 82 may be an independent unit, in which case the battery pack 4 is recharged by removing it from the main unit of the portable electronic device and mounting it in the battery charger 82. Alternatively, the battery charger 82 can be incorporated into the portable electronic device, in which case the battery pack 4 does not have to be removed for recharging.

The operation of the battery charger 82 will be described under the assumption that the batteries 12 and 14 are of the common nickel-cadmium type. These batteries have a well-known memory effect whereby overcharging causes a depression of the output voltage. The memory effect is erased by discharging, but only from that part of the battery capacity which is actually discharged. To erase the memory effect completely, the battery must be fully discharged.

The battery pack 4 will normally be recharged when one of its two batteries has reached full discharge. If the other battery is not yet fully discharged, it is possible that a memory effect remains in the undischarged part of the capacity of that battery, due to a previous overcharge. To ensure that this possible memory effect is eliminated, the battery can be conditioned by fully discharging it before recharging begins.

When the battery pack 4 is coupled to the battery charger 82, if the controller 92 detects that the second battery 14, for example, is fully discharged while the first battery 12 is not, it will first set switches 84 and 86 as shown in FIG. 16, so that the first battery 12 is discharged by the discharging unit 90 while the second battery 14 is being charged by the charging unit 88.

When the first battery 12 has been fully discharged, the controller 92 sets the discharge switch 86 to a neutral position so that neither battery 12 or 14 is coupled to the discharging unit 90. The controller 92 then starts the control scheme shown in FIG. 17. This drawing shows only the batteries 12 and 14, charge switch 84, charging unit 88, and their interconnections, omitting other elements for the sake of simplicity.

Figure 17:
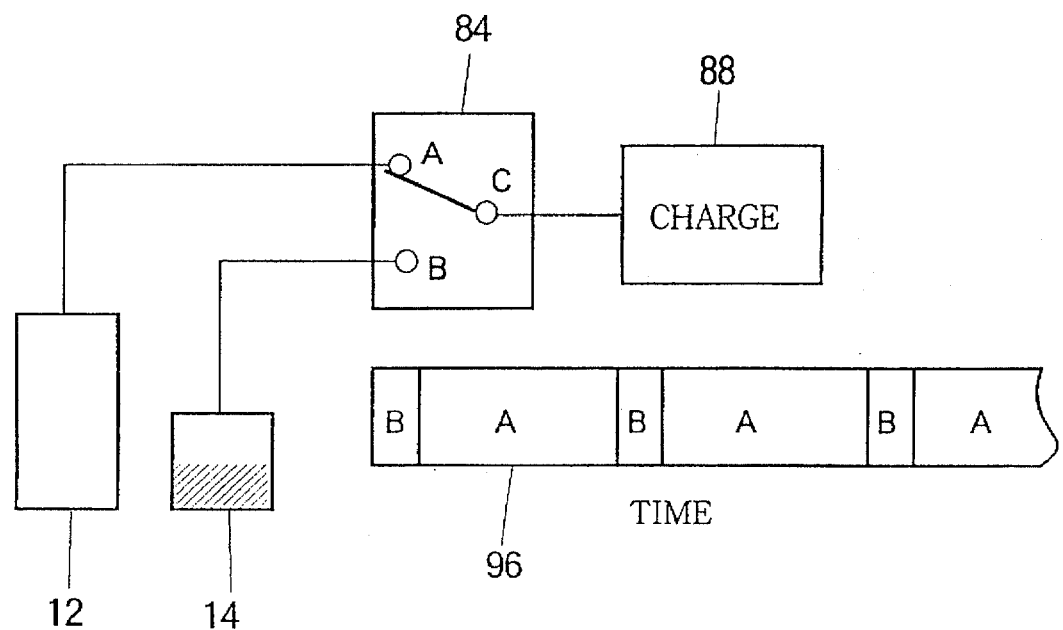
FIG. 17 illustrates recharging control for one discharge state of the two batteries in FIG. 16.

The sizes of the batteries 12 and 14 in FIG. 17 indicate their charge capacities. This figure is drawn so that the first battery 12 has twice the charge capacity of the second battery 14; for example, the first battery 12 may have a capacity of two ampere-hours and the second battery 14 a capacity of one ampere-hour. The shading in the second battery 14 indicates the extent to which the second battery 14 has been charged while the first battery 12 was being discharged. In the drawing, the second battery 14 has been 50% charged, and the first battery 12 has four times as much uncharged capacity as the second battery 14, e.g. two ampere-hours as opposed to one-half ampere-hour.

The controller 92 sets the charge switch 84 to positions A and B alternately for intervals proportional to the uncharged battery capacity. In the drawing, the ratio of uncharged battery capacity is four to one when the first battery 12 reaches full discharge, so the controller 92 first leaves the charge switch 84 at position B for one unit of time, then switches to position A for four units of time, then switches back to position B for one unit of time, and so on. The switching is indicated by a time-line graph 96 in FIG. 17.

Figure 18:
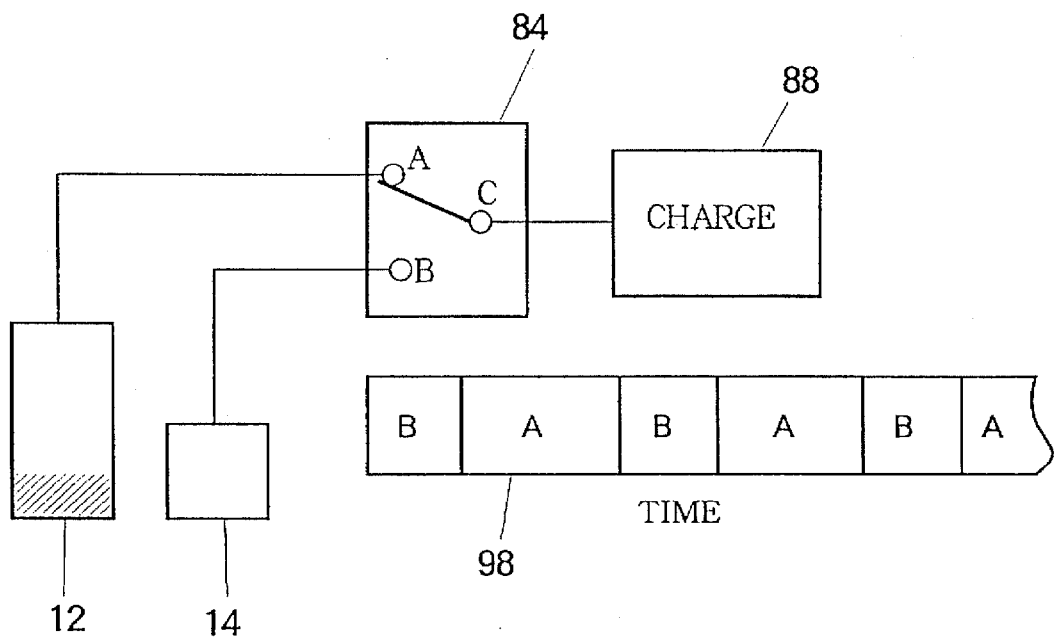
FIG. 18 illustrates recharging control for another discharge state of the two batteries in FIG. 16.

FIG. 18 shows another example of this control scheme, for a case in which the second battery 14 had remnant charge which was eliminated by the discharging unit 90 while the first battery 12 was being charged. In this example, when the second battery 14 reaches full discharge, the charging unit 88 has charged the first battery 12 to one-fourth of its capacity, so the ratio of uncharged capacity in the two batteries is three to two. The controller therefore sets the charge switch 84 alternately to position B for two units of time, then to position A for three units of time, as indicated by the time-line graph 98.

There is no particular restriction on the unit of time in this control scheme: it may be as short as a millisecond or as long as a minute, for example. It is desirable, however, that the unit of time be short in comparison to the total battery charging time, so that both batteries 12 and 14 will reach full charge at substantially the same time.

One reason for bringing both batteries 12 and 14 to full charge at substantially the same time is so that both batteries can be fully charged without overcharging either battery. A second reason is that if the battery pack 4 is removed from the battery charger 82 before charging is completed, both batteries will be charged to approximately the same percent of their full capacity, enabling the control schemes illustrated in FIGS. 12 and 13 to be used effectively. These advantages would not be provided by a recharging scheme that recharged the two batteries independently, or recharged first one battery, then the other, or recharged both batteries simultaneously at a fixed rate.

A further advantage of the invented battery charger 82 is that it can use the same current source to recharge both batteries 12 and 14, thereby simplifying the structure and control of the charging unit 84. Use of the same charging current is conditional on the two batteries' having similar output voltages, and on their charge capacities not being too greatly different.

The present invention is not limited to the embodiments described above, but includes further modifications such as the following.

The protective elements need not be fuses. Other current-limiting protective devices can be used instead.

The switches 40, 42, and 44 in FIGS. 10, 14, and 15, do not have to be field-effect transistors. Other types of switches can be used.

In FIGS. 10, 14, and 15, the control signal lines from the MCU 10 and voltage comparator 54 are shown as being connected directly to the gate of the first transistor switch 40, but they can of course be coupled to this gate through driver amplifiers, or through a logic gate such as a NAND gate. The same applies to the signals that control the second switch 42.

The number of batteries in the battery pack 4 is not limited to two. In a portable communication device, for example, a first battery could supply power to transmitting circuits, a second battery could supply power to receiving circuits, and a third battery could supply power to control and memory circuits.

The control schemes shown in FIGS. 12, 13, 17, and 18 can be modified in various ways. In FIG. 17, for example, the charge switch 84 could be left at position A until the first battery 12 had reached half of its full charge, matching the charged state of the second battery 14; then the two batteries could be charged in alternate intervals with a 2:1 ratio.

If the batteries in FIG. 16 are of a type that does not have a memory effect, the discharge switch 86 and discharging unit 90 can be eliminated. They can also be eliminated for nickel-cadmium batteries if charging of the batteries is controlled so as to prevent the memory effect from occurring, e.g. by preventing overcharging.

The battery pack need not be detachable from the main unit. The invention can also be practiced in portable electronic devices with permanently installed rechargeable batteries.

The utility of the invention is not limited to TDMA communications. It can be practiced advantageously in any type of portable electronic device having different types of loads, which would interfere with one another if connected to a common power line from a common battery.

Those skilled in the art will recognize that further modifications are possible without departing from the scope claimed below.

What is claimed is:

1. A portable electronic device comprising:
    a first load;
    a second load;
    a first battery;
    a second battery;
    a first power line coupled to said first load;
    a second power line coupled to said second load;
    a first switch for coupling said first battery to said first power line responsive to states of discharge of said first battery and said second battery;
    a second switch for coupling said second battery to said second power line responsive to said states of discharge of said first battery and said second battery;
    a third switch for coupling said first power line to said second power line responsive to said states of discharge of said first battery and said second battery;
    wherein said second load comprises a controller for controlling said first switch, said second switch, and said third switch responsive to states of discharge of said first battery and said second battery.

2. The device of claim 1, wherein said first battery and said second battery are housed in a detachable battery pack.

3. The device of claim 1, wherein said first load draws current in a varying manner, and said second load draws current in a steady manner.

4. The device of claim 1, wherein said device is a portable communication device and said first load comprises a power amplifier for use in transmitting.

5. The device of claim 1, further comprising:
    a first protective element coupled in series between said first battery and said first switch, for limiting current flow; and
    a second protective element coupled in series between said second battery and said second switch, for limiting current flow.

6. The device of claim 5, wherein said first protective element and said second protective element are fuses.

7. The device of claim 1, further comprising:
    a first voltage detector coupled to said first power line, for notifying said controller of voltage oil said first power line, thus enabling said controller to determine a state of discharge of said first battery; and
    a second voltage detector coupled to said second power line, for notifying said controller of voltage on said second power line, thus enabling said controller to determine a state of discharge of said second battery.

8. The device of claim 1, further comprising a timer module coupled to said controller, for measuring lengths of time for which said first load and said second load draw current, thus enabling said controller to determine said states of discharge of said first battery and said second battery.

9. The device of claim 1, further comprising:
a first external power terminal coupled to said first power line, for supplying power to said first power line; and
a third voltage detector coupled to said first external power terminal, for detecting supply of power from said first external power terminal and turning said first switch off when power is supplied from said first external power terminal.

10. The device of claim 9, wherein said first external power terminal is further coupled to said second power line, and said third voltage detector turns said second switch off when power is supplied from said first external power terminal.

11. The device of claim 9, further comprising:
a second external power terminal coupled to said second power line, for supplying power to said second power line; and
a fourth voltage detector coupled to said second external power terminal, for detecting supply of power from said second external power terminal and turning said second switch off when power is supplied from said second external power terminal.

12. A method of controlling the supply of current from a first battery and a second battery to a first load and a second load in a portable electronic device, comprising the steps of:
supplying current from said first battery to said first load, and independently supplying current from said second battery to said second load;
if said first battery becomes more discharged than said second battery by a certain first amount, disconnecting said first battery from said first load and supplying current from said second battery to both said first load and said second load;
if said second battery becomes more discharged than said first battery by a certain second amount, disconnecting said second battery from said second load and supplying current from said first battery to both said first load and said second load;
wherein said first load comprises a power amplifier for use in transmitting; and
wherein said first battery supplies current to said second load only when said power amplifier is not being used for transmitting.

13. The method of claim 12, wherein said first amount and said second amount are measured in terms of differences in percent of total discharge capacity of said first battery and said second battery.

14. The method of claim 12, comprising the further steps of:
monitoring output voltages of said first battery and said second battery; and
determining discharge states of said first battery and said second battery from said output voltages.

15. The method of claim 12, comprising the further steps of:
monitoring times for which said first load and said second load draw current from said first battery and said second battery; and
determining discharge states of said first battery and said second battery from said times.

16. The method of claim 12, wherein said portable electronic device is a communication device.

17. The method of claim 12, wherein said power amplifier is used for time-division multiplexed transmitting, and draws current in a burst fashion.

18. The method of claim 12, comprising the further step of:
disconnecting said first battery from said second load and supplying current from said second battery to said second load when, due to discharge of said first battery, said second battery is not more discharged than said first battery by at least a certain third amount.

19. The method of claim 12, comprising the further step of disconnecting both said first battery and said second battery from said first load and said second load and supplying current to said first load and said second load from an external power terminal, when current is available at said external power terminal.

20. A portable electronic device comprising:
a first load;
a second load comprising a controller;
a first battery;
a second battery;
a first power line coupled to said first load;
a second power line coupled to said second load;
a first switch for coupling said first battery to said first power line, said first switch being turned on and off by said controller;
a second switch for coupling said second battery to said second power line, said second switch being turned on and off by said controller;
a third switch for coupling said first power line to said second power line, said third switch being turned on and off by said controller;
a first voltage detector coupled to said first power line and to said controller, said first voltage detector determining a voltage on said first power line; and
a second voltage detector coupled to said second power line and to said controller, said second voltage detector determining a voltage on said second power line;
wherein said controller determines states of discharge of said first and second batteries in accordance with the voltages on said first and second power lines, initially turns on said first and second switches and turns off said third switch, turns off said second switch and turns on said third switch if the discharge of said second battery is greater than the discharge of said first battery by a first amount, and turns off said first switch and turns on said third switch if the discharge of said first battery is greater than the discharge of said second battery by a second amount.

21. The device of claim 20, wherein said first battery and said second battery are housed in a detachable battery pack.

22. The device of claim 20, wherein said first load draws current in a varying manner, and said second load draws current in a steady manner.

23. The device of claim 20, wherein said device is a portable communication device and said first load comprises a power amplifier for use in transmitting.

24. The device of claim 20, further comprising:
a first protective element coupled in series between said first battery and said first switch, for limiting current flow; and
a second protective element coupled in series between said second battery and said second switch, for limiting current flow.

25. The device of claim 24, wherein said first protective element and said second protective element are fuses.

26. The device of claim 20, further comprising:
a first external power terminal coupled to said first power line, for supplying power to said first power line; and
a third voltage detector coupled to said first external power terminal, for detecting supply of power from said first external power terminal and turning said first switch off when power is supplied from said first external power terminal.

27. The device of claim 26, wherein said first external power terminal is further coupled to said second power line, and said third voltage detector turns said second switch off when power is supplied from said first external power terminal.

28. The device of claim 26, further comprising:
a second external power terminal coupled to said second power line, for supplying power to said second power line; and
a fourth voltage detector coupled to said second external power terminal, for detecting supply of power from said second external power terminal and turning said second switch off when power is supplied from said second external power terminal.

29. A portable electronic device comprising:
a first load;
a second load comprising a controller and a timer module;
a first battery;
a second battery;
a first power line coupled to said first load;
a second power line coupled to said second load;
a first switch for coupling said first battery to said first power line, said first switch being turned on and off by said controller;
a second switch for coupling said second battery to said second power line, said second switch being turned on and off by said controller;
a third switch for coupling said first power line to said second power line, said third switch being turned on and off by said controller;
wherein said timer module measures lengths of time during which said first load and said second load draw current;
wherein said controller determines states of discharge of said first and second batteries in accordance with the lengths of time measured by said timer module, initially turns on said first and second switches and turns off said third switch, turns off said second switch and turns on said third switch if the discharge of said second battery is greater than the discharge of said first battery by a first amount, and turns off said first switch and turns on said third switch if the discharge of said first battery is greater than the discharge of said second battery by a second amount.

30. The device of claim 29, wherein said first battery and said second battery are housed in a detachable battery pack.

31. The device of claim 29, wherein said first load draws current in a varying manner, and said second load draws current in a steady manner.

32. The device of claim 29, wherein said device is a portable communication device and said first load comprises a power amplifier for use in transmitting.

33. The device of claim 29, further comprising:
a first protective element coupled in series between said first battery and said first switch, for limiting current flow; and
a second protective element coupled in series between said second battery and said second switch, for limiting current flow.

34. The device of claim 33, wherein said first protective element and said second protective element are fuses.

35. The device of claim 29, further comprising:
a first external power terminal coupled to said first power line, for supplying power to said first power line; and
a third voltage detector coupled to said first external power terminal, for detecting supply of power from said first external power terminal and turning said first switch off when power is supplied from said first external power terminal.

36. The device of claim 35, wherein said first external power terminal is further coupled to said second power line, and said third voltage detector turns said second switch off when power is supplied from said first external power terminal.

37. The device of claim 35, further comprising:
a second external power terminal coupled to said second power line, for supplying power to said second power line; and
a fourth voltage detector coupled to said second external power terminal, for detecting supply of power from said second external power terminal and turning said second switch off when power is supplied from said second external power terminal.

38. A method of controlling the supply of current from a first battery and a second battery to a first load and a second load in a portable electronic device, comprising the steps of:
supplying current from said first battery to said first load, and independently supplying current from said second battery to said second load;
if said first battery becomes more discharged than said second battery by a certain first amount, disconnecting said first battery from said first load and supplying current from said second battery to both said first load and said second load;
if said second battery becomes more discharged than said first battery by a certain second amount, disconnecting said second battery from said second load and supplying current from said first battery to both said first load and said second load;
wherein said first load comprises a power amplifier for use in transmitting; and
wherein said second battery supplies current to said first load only when said power amplifier is being used for transmitting.

39. The method of claim 38, wherein said first amount and said second amount are measured in terms of differences in percent of total discharge capacity of said first battery and said second battery.

40. The method of claim 38, comprising the further steps of:
monitoring output voltages of said first battery and said second battery; and
determining discharge states of said first battery and said second battery from said output voltages.

41. The method of claim 38, comprising the further steps of:
monitoring times for which said first load and said second load draw current from said first battery and said second battery; and
determining discharge states of said first battery and said second battery from said times.

42. The method of claim 38, wherein said portable electronic device is a communication device.

43. The method of claim 38, wherein said power amplifier is used for time-division multiplexed transmitting, and draws current in a burst fashion.

44. The method of claim 38, comprising the further step of:

disconnecting said second battery from said first load and supplying current from said first battery to said first load, if said second battery becomes discharged by more than a certain fourth amount.

45. The method claim 38, comprising the further step of:

disconnecting both said first battery and said second battery from said first load and said second load and supplying current to said first load and said second load from an external power terminal, when current is available at said external power terminal.

46. A method of controlling the supply of current from a first battery and a second battery to a first load and a second load in a portable electronic device, comprising the steps of:

supplying current from said first battery to said first load, and independently supplying current from said second battery to said second load;

if said first battery becomes more discharged than said second battery by a certain first amount, disconnecting said first battery from said first load and supplying current from said second battery to both said first load and said second load;

if said second battery becomes more discharged than said first battery by a certain second amount, disconnecting said second battery from said second load and supplying current from said first battery to both said first load and said second load;

wherein said second load comprises a controller for controlling the steps of disconnecting said first battery and disconnecting said second battery, said controller responsive to states of discharge of said first battery and said second battery.

47. The method of claim 46 wherein said first amount and said second amount are measured in terms of differences in percent of total discharge capacity of said first battery and said second battery.

48. The method of claim 46, comprising the further steps of:

monitoring output voltages of said first battery and said second battery; and determining discharge states of said first battery and said second battery from said output voltages.

49. The method of claim 46, comprising the further steps of:

monitoring times for which said first load and said second load draw current from said first battery and said second battery; and determining discharge states of said first battery and said second battery from said times.

50. The method of claim 46, wherein said portable electronic device is a communication device.

51. The method of claim 46, wherein said power amplifier is used for time-division multiplexed transmitting, and draws current in a burst fashion.

52. The method of claim 46, wherein said first load comprises a power amplifier for use in transmitting; and wherein said first battery supplies current to said second load only when said power amplifier is not being used for transmitting.

53. The method of claim 46, comprising the further step of:

disconnecting both said first battery and said second battery from said first load and said second load and supplying current to said first load and said second load from an external power terminal, when current is available at said external power terminal.

* * * * *